United States Patent
Natarajan et al.

(10) Patent No.: US 12,302,129 B2
(45) Date of Patent: May 13, 2025

(54) METHOD AND APPARATUS FOR SCALABLE ML-BASED FRAMEWORKS FOR RESOURCE PLANNING IN ENTERPRISE NETWORKS

(71) Applicant: Celona, Inc., Cupertino, CA (US)

(72) Inventors: Preethi Natarajan, San Diego, CA (US); Mehmet Yavuz, Palo Alto, CA (US)

(73) Assignee: CELONA, INC., Campbell, CA (US)

( * ) Notice: Subject to any disclaimer, the term of this patent is extended or adjusted under 35 U.S.C. 154(b) by 795 days.

(21) Appl. No.: 17/573,523

(22) Filed: Jan. 11, 2022

(65) Prior Publication Data
US 2023/0142927 A1    May 11, 2023

Related U.S. Application Data

(60) Provisional application No. 63/276,490, filed on Nov. 5, 2021.

(51) Int. Cl.
*H04W 24/02*    (2009.01)
*H04W 28/16*    (2009.01)

(52) U.S. Cl.
CPC ........... *H04W 24/02* (2013.01); *H04W 28/16* (2013.01)

(58) Field of Classification Search
CPC ..... H04W 16/18; H04W 24/02; H04W 28/16; G06F 11/0778; G06F 11/079; G06F 16/285; G06F 18/22; G06F 18/23
See application file for complete search history.

(56) References Cited

U.S. PATENT DOCUMENTS

| | | | |
|---|---|---|---|
| 10,555,191 B1 * | 2/2020 | Jat | H04W 24/08 |
| 2008/0270374 A1 * | 10/2008 | Li | G06F 16/24558 |
| | | | 707/999.005 |

(Continued)

FOREIGN PATENT DOCUMENTS

CN    114205741 A  *  3/2022  ........... G01S 5/0264

*Primary Examiner* — Matthew C Sams
(74) *Attorney, Agent, or Firm* — Jaquez Land Greenhaus & McFarland, LLP; Bruce W. Greenhaus

(57) ABSTRACT

Method and apparatus for scalable machine learning (ML)-based frameworks for resource planning and recommendations for Enterprise Networks are disclosed. In some embodiments, a method for determining network health assessment and providing network planning and recommendations in wireless enterprise networks is provided. The method quantifies resource health of a plurality of network elements operating within the enterprise network by calculating a plurality of distance metrics between acceptable health parameters and observed network resource utilization values associated and corresponding to each selected network element. The method ranks each of the network elements based upon the distance metrics calculated for each network element. Factors that negatively impact the resource health of the network elements are ranked in accordance to how severely they impact the performance of the network elements. The method and apparatus provide suggestions and recommendations to improve network performance of the network elements. An apparatus for scalable machine-learning (ML)-based frameworks for resource planning in enterprise networks is also disclosed.

37 Claims, 11 Drawing Sheets

(56) References Cited

U.S. PATENT DOCUMENTS

| | | | |
|---|---|---|---|
| 2014/0297640 A1* | 10/2014 | Duftler | G06F 9/46 |
| | | | 707/737 |
| 2020/0029240 A1* | 1/2020 | Li | H04W 28/0226 |
| 2020/0251008 A1* | 8/2020 | Park | G09B 7/04 |
| 2020/0334093 A1* | 10/2020 | Dubey | G06F 18/23 |
| 2023/0142927 A1* | 5/2023 | Natarajan | H04W 28/16 |
| | | | 455/418 |
| 2023/0199511 A1* | 6/2023 | Singh | H04W 28/021 |
| | | | 370/230 |
| 2023/0199514 A1* | 6/2023 | Singh | H04W 24/10 |

\* cited by examiner

METHOD AND APPARATUS FOR SCALABLE ML-BASED FRAMEWORKS FOR RESOURCE PLANNING IN ENTERPRISE NETWORKS

CLAIM OF PRIORITY TO PREVIOUSLY FILED PROVISIONAL APPLICATION—INCORPORATION BY REFERENCE

This utility application claims priority under 35 USC section 111 (b) and under 35 USC section 119 (e), to earlier-filed provisional application No. 63/276,490 filed Nov. 5, 2021, entitled "Method and Apparatus for Scalable ML-Based Frameworks for Resource Planning in Enterprise Networks"; and the contents of the above-cited earlier-filed provisional application (App. No.: 63/276,490) are hereby incorporated by reference herein as if set forth in full.

BACKGROUND

(1) Technical Field

The disclosed method and apparatus relate generally to scalable machine-learning (ML)-based frameworks for resource planning in wireless networks, and especially in applying ML-based frameworks for resource planning in wireless networks operating within enterprise networks (ENs).

(2) Background

Resource planning as part of LTE/5G operations is technically a very complex process and requires skilled personnel to manually intervene and make decisions regarding the best way to deploy and make use of available network resources. Successful deployments of enterprise networks (ENs) require scalable resource planning as part of the operation and management of the ENs. Scalable resource planning can be greatly assisted by accurate and adaptable resource planning analytics. Network capabilities are usually measured in terms of performance and functionality. Improved network analytics lead to improvements in network capacity planning and traffic management within an Enterprise Network (EN).

Analytics play a very important role in optimizing the allocation of resources and in improving network operations in enterprise networks (ENs). Improvements in network analytics capabilities can support better capacity planning and traffic management in ENs. Scalability is important in ENs because the network must accommodate increases in network traffic and in increasing numbers of networked applications. Monitoring and understanding how the EN is performing is critical. Using Machine Learning (ML)-based frameworks for resource planning and recommendations greatly assist administrators, operators, and designers in making better informed decisions to improve the performance, speed and capacity of EN resource elements and in ENs in general.

Analytics play a critical role in improving network operations. Network trends and statistics can be determined using effective network analytics. Network analytics involves the analysis of network resource data and statistics to identify trends and patterns in network performance, and more specifically in performance of network elements. Artificial intelligence (AI) and Machine-Learning (ML)-based frameworks can be used together with traditional network analytic approaches to improve the performance and optimization of enterprise networks (ENs). Network analysis provides an important basis upon which system designers make decisions regarding the deployment and architectural design changes of the ENs.

Resource planning analytics should help answer questions about network performance and functionality including the following questions/issues: (1) what is the resource usage (e.g., radio, compute, memory, network bandwidth, traffic volume) of network elements (such as, for example "AP", "Edge", etc.) in the EN?; (2) are there sufficient resources to support the promised quality of service (QoS) for current and future traffic?; (3) are there resource-constrained network elements in the EN? If so, the resource planning analytics should be able to determine and identify the resource-constrained network elements in the EN; and (4) are there suggestions or design improvements that would improve the resource constraint issues, and if so, aid in making those suggestions and/or design improvements.

Therefore, a need exists for a method and apparatus for scalable machine learning (ML)-based frameworks for resource planning and recommendations in wireless networks, and especially as applied to wireless networks operating within Enterprise Networks (EN). The present disclosure describes embodiments of such a method and apparatus.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
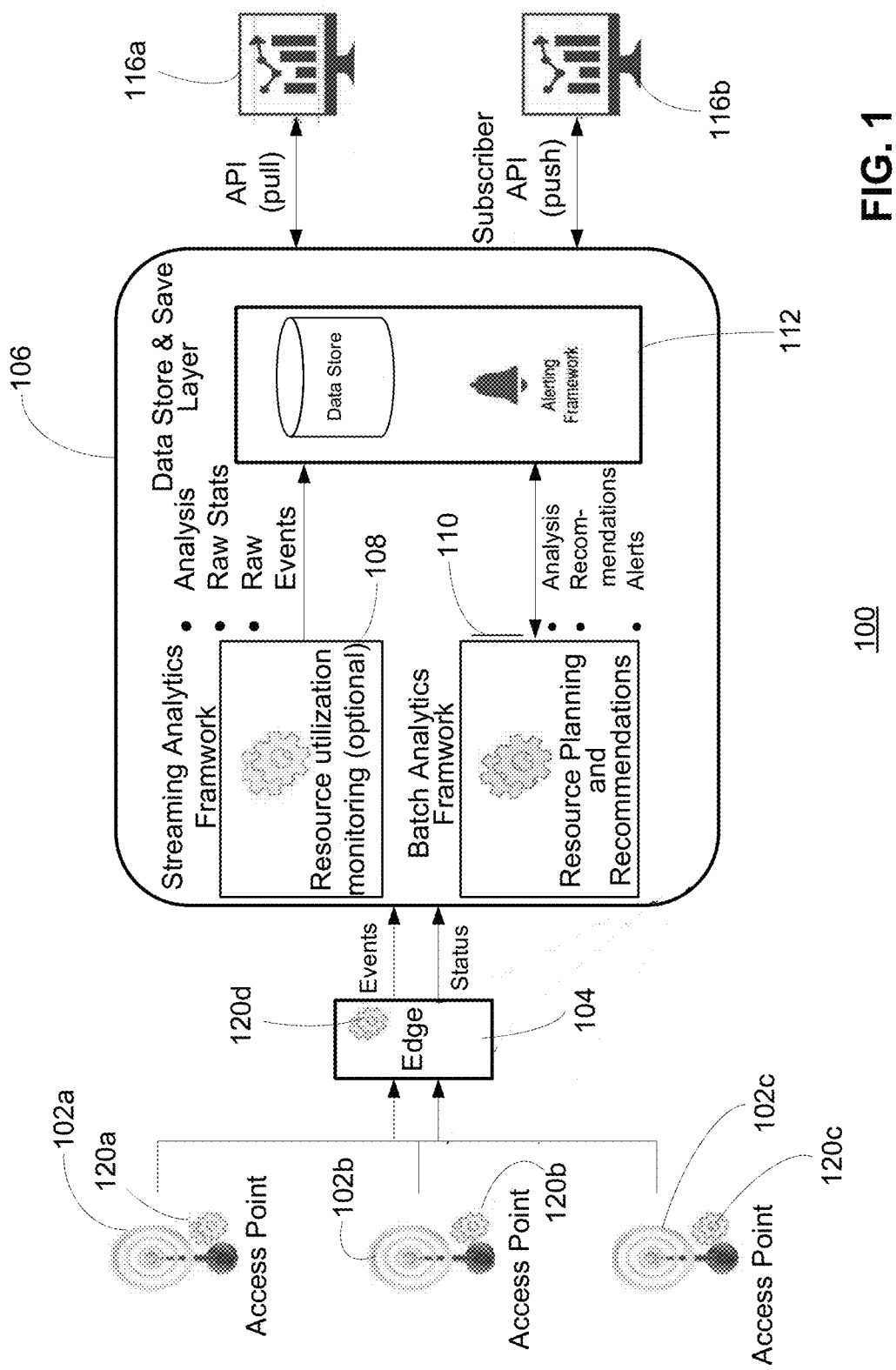
FIG. 1 is an illustration of components of a communications network 100 having network analytics capability.

FIG. 1 is an illustration of components of a communications network 100 having network analytics capability. It is commonplace today for communications to occur over a wireless network in which user equipment (UE) connects to the network via a wireless transceiver, such an eNodeB, gNodeB, access point or base station, hereafter referred to generically as a BS/AP (base station/Access Point) or more simply, an Access Point (AP). A wireless device operated by a user, commonly referred to as a "User Equipment" (UE), is typically in wireless communication with an Access Point (AP) 102 (such as AP 102a, AP 102b and AP 102c) of the communications network 100. In this disclosure the term eNodeB is shortened to the term "eNB" and is used generically to refer to the following: a single sector eNB/gNB; a dual sector eNB/gNB, with each sector acting independently; and a node that supports both eNB and gNB functions. The UE may be a wireless cellular telephone, tablet, computer, Internet-of-Things (IoT) device, or other such wireless equipment. The BS/AP, or AP, may be an eNodeB ("eNB") as defined in 3GPP specifications for long term evolution (LTE) systems (sometimes referred to as $4^{th}$ Generation (4G) systems) or a gNodeB as defined in 3GPP specifications for new radio (NR) systems (sometimes referred to as 5G systems). Furthermore, the AP may be a single sector node or a dual sector node in which each of two sectors act independently.

As shown in FIG. 1, the various APs (102a, 102b, and 102c, for example) communicate with an Edge 104. The Edge 104 communicates with a Cloud Orchestrator 106 reporting both "events" and statistics to the Cloud Orchestrator 106. As shown in FIG. 1, each network element includes an associated and corresponding monitoring element 120. For example, the AP 102a has an associated and corresponding monitoring element 120a, the AP 102b has an associated and corresponding monitoring element 120b, the Edge 104 has an associated and corresponding monitoring element 120d, and so on. As shown in FIG. 1, in some embodiments, the Cloud Orchestrator 106 comprises four components: a Streaming Analytics Framework 108 which optionally performs resource utilization monitoring; a Batch Analytics Framework 110 which performs resource planning and recommendation; and a Data Store and Alert Framework component 112. The Streaming Analytics Framework 108 outputs analysis results, raw statistics and raw "events" to the Data Store and Alert Framework component 112. The Streaming Analytics Framework 108 performs "pre-processing" analytic functions. The Streaming Analytics Framework 108 can analyze large amounts of data to flag potential issues.

However, the bulk of the network resource analytics, described in detail below, is performed in some embodiments by the Batch Analytics Framework 110. Analyses, recommendations, and alerts are communicated between the Batch Analytics Framework 110 and the Data Store and Alert Framework component 112. The information and recommendations processed by the Cloud Orchestrator 106 is made available to system users or operations administrators via the user interface "APIs" such as the "pull" API accessible by the user interface 116a and the Subscription "Push" API accessible by the user interface 116b. The network administrators may make configuration changes to various network elements based upon the information provided by the Batch Analytics Framework 110. The configuration changes could be made responsive to the analysis and recommendations provided by the Batch Analytics Framework 110 in order to alleviate or eliminate resource issues observed for certain identified network elements.

The communications network 100 having network analytics capability provides a framework for using ML (machine learning)-based methods for scalable resource planning in private mobile networks such as enterprise networks (ENs). Very briefly, the scalable resource planning method is performed via the following steps: (1) Identify resource-constrained elements within a group of network elements (for example, a site); (2) Identify significant factors contributing to the resource constraint issues at the network elements; and finally, (3) Based on identified factors, generate contextual suggestions and/or recommendations to address the network resource issues. In step (1), resource-constrained network elements are automatically identified from a logical group of network elements (ex: CBRS devices in a site, edge nodes in an enterprise etc.). Automatic identification is done based on monitoring proposed metrics relevant to resource usage and availability. In step (2), significant factors that are contributing to the resource issues are identified. This step attempts to answer the questions of why problems are occurring within the network and specifically within identified network elements in a group of network elements. For example, and referring again to FIG. 1, assuming that the AP 102a has a problem with its CPU, step (2) attempts to identify the factors contributing to the CPU problem. Or, for example, if the AP 102b is having a Physical Resource Blocks (PRBs) or capacity issue, step (2) attempts to identify this cause or causes that lead to the identified network resource issues. The causes of resource issues within the EN can vary in nature and in severity. Step (2) also attempts to identify the most significant and most pressing factors that are causing the identified resource issues of a network element. In step (3), suggestions and/or recommendations to counter the most pressing factors are generated.

The method and apparatus for scalable Machine Learning-based frameworks for resource planning in ENs perform the following analytical procedures. In some embodiments, the ML-based framework comprises an optional real-time monitoring phase that performs first pass analytics in order to identify network elements for further analysis. This real-time monitoring phase monitors network elements for symptoms (for example, frequency, duration, changepoints) and persistent observations. This monitoring service can be executed on a cloud or at the network elements, assuming cycles are available for such monitoring. Optionally, the monitoring service can perform closer to the data source, in accordance with enhancements specified in the 3GPP TS 23.288 specifications standard. One exemplary TS 23.288 standard is the ETSI TS 123 288 V16.5.0 standard, published in October 2020, and entitled "5G; Architecture enhancements for 5G System (5GS) to support network data analytics services (3GPP TS 23.288 version 16.5.0 Release 16", which standard is hereby incorporated by reference herein as if set forth in full. While this real-time monitoring phase is optional, the analysis performed during this phase reduces the number of network elements that undergo a "detailed batch analysis phase".

Detailed Batch Analysis Phase:

The method and apparatus for scalable Machine Learning-based frameworks for resource planning in ENs perform the following detailed batch analysis procedures. The batch analysis phase leverages historical data in order to score network elements that are potentially resource-constrained. The batch analysis phase identifies top factors/causes that are contributing to the resource issues and constraints being experienced by a network element. Based on the top factors/causes that are determined during the batch analysis phase, the method generates element-specific and factor-specific recommendations to address resource issues and constraints being experienced by a network element. Finally, the batch analysis phase generates an EN-level summary of sites with top issues and recommendations for addressing the resource issues and constraints occurring within the network.

Solution Apparatus

Figure 2:
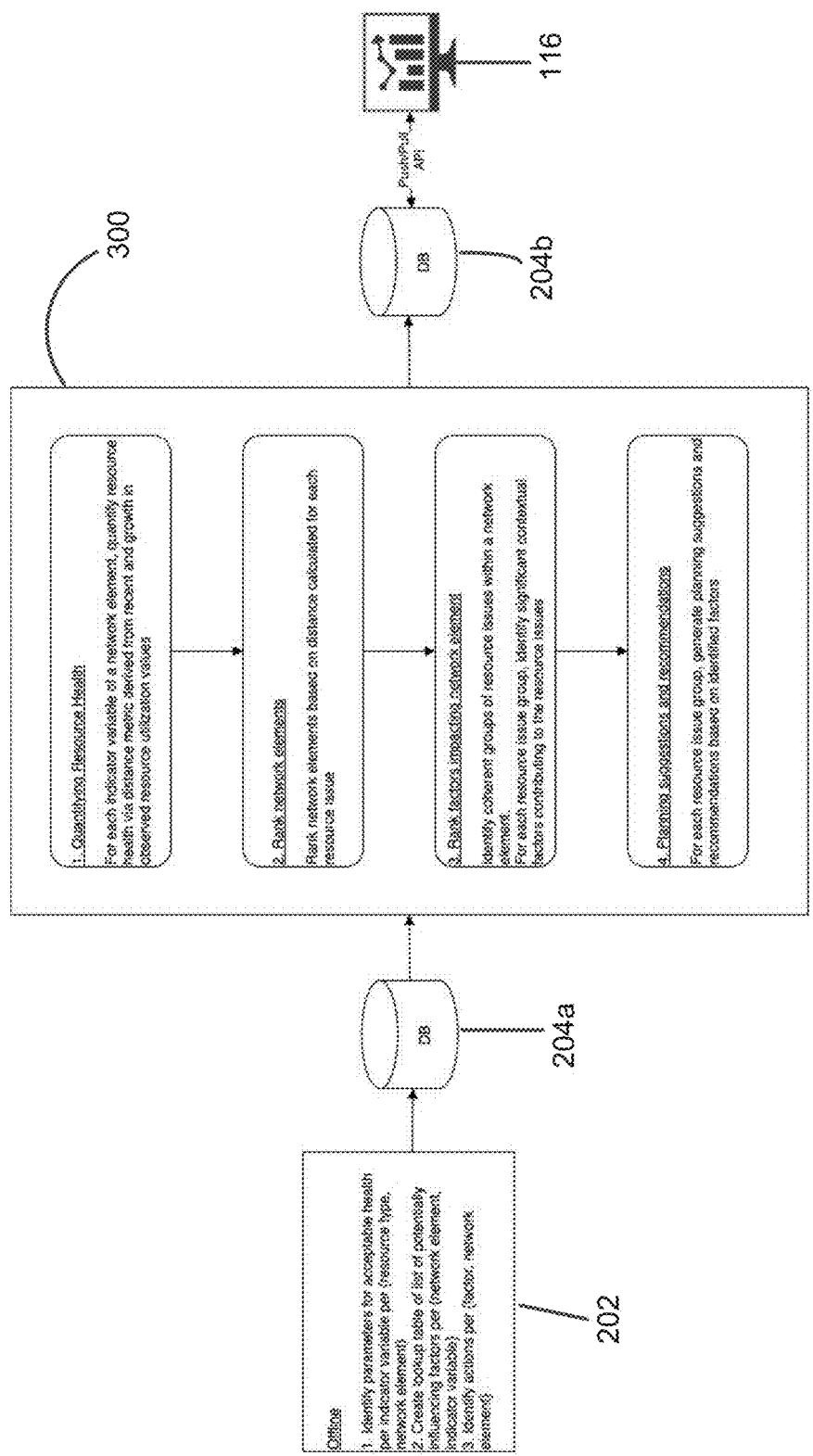
FIG. 2 is a solution apparatus that is used in some embodiments of the presently disclosed scalable Machine Learning (ML)-based framework for resource planning in Enterprise Networks.

FIG. 2 shows components of a solution apparatus 200 that is used in some embodiments of the presently disclosed scalable Machine Learning (ML)-based framework for resource planning in ENs performs the following detailed batch analysis procedures. As shown in FIG. 2, in some embodiments the solution apparatus 200 comprises an "offline" component 202, a first database 204a, an Analytics and Recommendation component 300, a second database 204b, and a User Interface/API 116. Referring again to FIG. 2, the "offline" component 202 identifies parameters for acceptable health per indicator variables per resource type or network element (e.g., {resource type, network element}). In some embodiments, the offline component 202 creates a lookup table wherein it maintains a list of potentially influencing factors per network element and indicator variable (e.g., {network element, indicator variable}). As shown in FIG. 2, the offline component 202 may also identify factor-specific planning actions/options to be taken within the EN (e.g., {factor, network element}). These parameters may then be stored in the first database 204a.

The parameters stored in the first database 204a are provided as input to the Network Health Assessment and Planning/Recommendations method component 300 as shown in FIG. 2. The details of the Network Health Assessment and Planning/Recommendations method component 300 are described in more detail in the flowchart 300' shown in FIG. 3 and are described in much greater detail hereinbelow. The Network Health Assessment and Planning/Recommendations method component 300 outputs its determinations and data to the second database 204b. As shown in FIG. 2, the contents of the second database are accessible to and by the User Interface/API 116. This information is accessible via a push/pull basis. The four elements shown in the Health Assessment and Planning/Recommendations component 300 of FIG. 2 are now described in more detail with reference to the flowchart 300' of FIG. 3.

Figure 3:
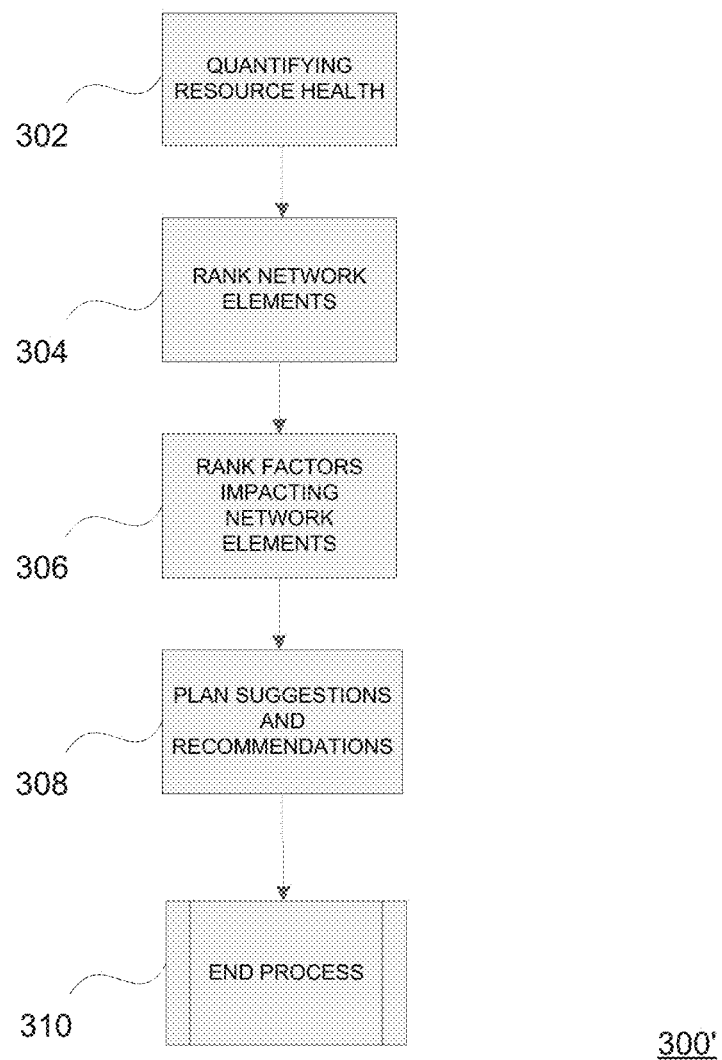
FIG. 3 is a flowchart of the Network Health Assessment and Planning/Recommendations method component of FIG. 2.

FIG. 3 is a flowchart of the Network Health Assessment and Planning/Recommendations method of the present disclosure. As shown in FIG. 3, the method 300' comprises four (4) major steps: (a) a Quantifying Resource Health step 302; (b) a Ranking of Network Elements step 304; (c) a Ranking of Factors impacting Network Elements and their performance step 306; (d) a Planning Suggestions and/or Recommendations to address issues/problems found in the network elements and the network step 308; and finally, an End Process step 310. Each of the steps of the method 300' are described in much greater detail hereinbelow.

Each network element has an associated and corresponding "indicator variable" ("IV") that is indicative of either resource usage metric or resource availability metric associated with the network element. At the step 302 of the method 300' of FIG. 3, for each indicator variable of a network element, a resource health of a network element is quantified. In some embodiments, the resource health of a network element is quantified using a "distance" metric between recent and increases in observed resource IV values. For each indicator variable (IV) of a network element, a "distance" metric is determined at the step 302 which is indicative of the network element's resource issues and relative constraints being experienced by the network element. In general, a distance metric is a symmetric metric that relates to an objective difference between two entities. In this case, the distance metric is indicative of observed symptoms caused by resource issues for that network element. As a network element's resource issues and resource constraints worsen, the calculated "distance" between "good" or "acceptable" health parameters and the observed health parameters of the network element increases. Poor health parameters are indicative of potential performance issues and can eventually lead to failure in meeting SLAs. As symptoms related to resource issues for a network element become more severe, the calculated distance metric increases in value. Said in another way, increases in distance metrics for a network element indicate worsened resource health of that network element.

At the step 304 of the inventive method 300', network elements are ranked in accordance with a determined extent of their associated resource constraint issues. More specifically, network elements are ranked based upon the calculated distance metrics for each of the network element's IV in the step 302. At the step 306, the factors negatively impacting a specific network element's health are ranked in accordance with how severely each of the factors impacts performance at the network element. During the step 306, coherent groups of resource issues within a network element are identified. For each resource issue group that is identified, significant "contextual" factors are identified wherein the contextual factors contribute to the network element's resource constraint issues. At the step 308 of the method 300', and for each resource issue group identified at the step 306, suggestions and recommendations are made for each resource issue group based upon the factors identified at the step 306. The suggestions and recommendations are made to improve the performance of the EN and alleviate the resource constraints on network elements. The method 300' terminates at an end process step 310.

The remainder of the present disclosure provides details of some embodiments of the method 300' shown in FIG. 3. However, although some embodiments of the method 300' are described in great detail, it will be appreciated by those skilled in the analytics, and in the wireless networks arts in particular, that variations to the described method 300' may be made without departing from the scope of the presently described method and apparatus for scalable ML-based frameworks for resource planning in Enterprise Networks. Thus, the breadth and scope of the claimed invention is not limited by any of the examples described herein. Rather, the breadth and scope of the claimed invention is limited only by the claims, and not by the detailed description of some of the embodiments of the present method and apparatus for scalable ML-based frameworks for resource planning in Enterprise Networks.

Quantifying Resource Health

The resource health of each network element of an Enterprise Network must be quantified. A determination must be made as to whether observed monitoring data received from the various monitoring elements, for example, indicate or suggest possible resource issues at a network element. From a planning perspective, and for each network element type in the Enterprise Network, one or more resources are identified that require monitoring and observation. In addition, each network element type has associated and corresponding "IVs" that indicate either the resource utilization or resource availability of one or more resources of a network element. Each network element type has a defined set of resources (one or more resources for each network element type). Each resource is associated with IVs that reflect the (i) resource usage, (ii) service rejections due to resource constraints or unavailability, and (iii) preemption of ongoing service to allow higher priority service. For example, for an AP, such as the APs 102a, 102b, and 102c of FIG. 1, the resource is "capacity". In some embodiments, the IVs to be tracked in order to monitor the capacity utilization are as follows: Admission rejects (RRC, ERAB), Physical Resource Block (PRB) utilization, and service preemptions. This is just one example of a network element type, resource, and indicator variables associated with the resource. Many others are possible. Examples of network element types and associated and corresponding indicator variables are set forth below:

Network element=AP; Resource=capacity:
Indicator variables={Count of admission rejects (RRC, ERAB-GBR, ERAB-Non-GBR), PRB utilization, Count of service preemptions}
Network element=AP, Edge; Resource=CPU, memory, disk:
Indicator variables={CPU/memory/disk utilization, packet latency, packet drop ratio}
Network element=Edge; Resource=Network:
Indicator variables={Backhaul bandwidth utilization, AP-Edge bandwidth utilization, packet latency, packet drop ratio}.

In practice, the assignment of resources and indicator variables to be tracked is performed "off-line" and typically in consultation with Enterprise Network operators and designers. This is shown in some embodiments as being performed off-line within the element 202 of FIG. 2. In addition, as shown in the element 202 of FIG. 2, a look-up table containing a list of potentially influencing factors can be created and maintained (e.g., network element, indicator value) offline.

Both the resources and resource health indicator variables are monitored for each network element in order to determine if a health issue exists for the network element.

Defining Parameters for Acceptable Resource Health

Another process that occurs "off-line" in some embodiments is to define parameters for acceptable resource health of a network element. One goal is to identify a distribution of values of indicator variables that are indicative of acceptable or good resource health, and in contrast, identify a distribution of values that are indicative of unacceptable or poor resource health. For example, acceptable or healthy CPU utilization (a resource used by an AP network element, for example) generally falls within a range between 40% and 80%. If the CPU utilization exceeds 80%, this can be considered concerning and consistent high values over an extended period of time would be definitive evidence of poor CPU health of the associated network element. So, for each resource of a network element type, a distribution of values of indicator variables are defined which indicate good resource health. Deviations from the defined distribution of "good resource health" indicator variables, especially deviations over an extended time period, are indicative of resource issues in the network element. One goal of the present method and apparatus is to capture these deviations via an objective distance metric that can be used to identify most concerning resource issues at a network element.

In some embodiments, the method considers both recent and trending values in making the resource health quantification determination, and therefore parameters for both recent and trending estimates are identified. "Recent" values might be data obtained during the previous 1-2 weeks, while "trending" values might indicate where the data is trending over a longer time period. For example, trending data might be derived by determining growth rate in network resource usage of a network element over the past one or two months.

Initially, very little data might be available to aid in defining acceptable resource health parameters and their associated distributions. In such cases, discussions with domain experts (described below in more detail) are used to define the acceptable distribution. As additional data is obtained, the method can be refined to more accurately define these parameters based upon the accumulated data related to network element resource usage. In some embodiments of the present method and apparatus, parameters for acceptable resource heath of network elements are derived from data obtained from consulting with domain experts. In accordance with this method, indicator variable values are greater than or equal to 0. Resources of a network element are more constrained as the indicator values increase (i.e., resources are more constrained for higher resource indicator values). The higher the value of an indicator variable, the worse the resource health of the network element.

Based on discussions with domain experts, two boundaries (or "thresholds") are determined for acceptable values of indicator variables of the network elements and for the various network element types. The two bounds (or thresholds) are defined herein as a lower bound (or "L_b") and an upper bound (or "U_b") for the IV. The upper and lower IV bounds should be determined for each IV being monitored. The upper bound (U_b) of an IV represents the threshold above which the system can experience unacceptable performance. That is, values above the upper bound (U_b) are considered as threshold violations. Such threshold violations lead to, for example, the enterprise network under-performing and is therefore undesirable. For example, indicator variables that exceed the U_b may cause data packets to be dropped. In some examples, domain experts are consulted to determine the Nth (for example, where "N"=95) percentile of IV values that would qualify as exhibiting good resource health for the selected resource of a given network element. As will be obvious to those skilled in the wireless communications and analytics arts, this is only one means of determining the upper and lower bounds. Other means may be used and fall within the scope of the present disclosure.

Resource indicator values observed that fall below the lower threshold (L_b) are of no concern and do not require further analysis or consideration. Values of IV that exceed the L_b and lower than U_b may in some embodiments be placed in a "watch" mode for further monitoring. The above description applies to "recent" data observed in the EN. As described above, trending (slope) data might be derived by determining the increase in IV values of a network element over the past one or two months. In some embodiments, the trend parameters reflect the resource growth rates of observed IV values. Consultation with domain experts provides initial values for acceptable growth rates for an IV.

In some embodiments of the present method and apparatus, the following variables indicative of resource health (and calculated per time period t) are considered:
- Resource utilization=resource used/resource available
- Service rejection count ("count-related data")=wherein service is rejected due to lack of resources (for example, dedicated bearer rejections, and admission rejections).
- Service preemption count ("count-related data")=ongoing service preempted to allow higher priority service (for example: dedicated bearer preemptions).

In some embodiments and for resource planning purposes, the presently disclosed method and apparatus identify potential resource issues based on observed IV values in recent period (r_days=2 weeks, for example). In some embodiments, the method and apparatus also consider growth trends in longer term IV values (t_days=30 days, for example). For example, and as described in greater detail below, a distance d_R between acceptable and observed recent values (over r_days) normalized per time period t is determined. In some embodiments, a trending distance d_T is determined between acceptable and observed resource utilization growth values over a period of t_days) normalized per time period t.

Two Exemplary Methods of Identifying Parameters for Acceptable Resource Health Obtained from Domain Experts In order to accurately identify resource issues within an EN, two examples of methods are described wherein the methods are used to derive parameters of distributions of acceptable IV values obtained from network elements within the EN. A first example of a method is used to derive a Gaussian distribution that can be applied to utilization IVs. A second example of a method is used to derive a Poisson distribution that can be applied to "count-related" IVs such as service rejections or service preemptions. Other more complex methods for deriving distributions of resource health parameters may be used to practice the present method and apparatus without departing from the scope of the claimed disclosure. For example, additional data might be derived from simulations, lab testing, field trials, etc. Additional data might in some embodiments be obtained by observing "good health" network elements in the same site or same EN. This additional data, in some embodiments, could be used to derive more complex distribution types.

Both methods described below (for the "Gaussian" method and the "Poisson" distributions) consider both recent and growth (trend) values in the quantification logic. Therefore, parameters for both recent (r) and growth (g) estimates may need to be identified. In some embodiments, users and domain experts are able to access the EN via the UI/API 116 (shown in FIG. 1) to input and tweak these parameters. The users and domain experts could provide distribution characteristics such as PDF and CDF (and others) via the UI/API that experts can use to adapt.

Eliciting Parameters for a Gaussian Distribution for an Indicator Variable

The method for determining parameters for a Gaussian distribution of IV values is now described. Two bounds are elicited from the domain experts as part of recent parameters, r: L_b, U_b, wherein L_b is the lower bound and U_b is the upper bound. In this example, the U_b is equivalent of the $95^{th}$ percentile of acceptable range of IV values. Values that exceed the upper bound U_b are considered threshold violations that can lead the system or EN into unacceptable operational states. For example, resource utilization exceeding U_b can cause increased delays/drops leading to SLA violations which is undesirable. As described above, values falling below the lower threshold L_b are not of concern. IV values between the Lower bound (L_b) and the Upper bound (U_b) may be placed in a "watch" mode for further monitoring.

In some embodiments both a mean and a standard deviation for the Gaussian distribution are determined in accordance with the following two equations:

$$\text{Mean}, m = (L\_b + U\_b)/2 \quad \text{Equation 1:}$$

$$\text{Stdev}, s = (U\_b - m)/1.645 \text{ (where } U\_b \text{ corresponds to } 95^{th} \text{ percentile as described above and where 1.645 is } Z \text{ score corresponding to } 95^{th} \text{ percentile)}. \quad \text{Equation 2:}$$

It will be understood by those skilled in the statistics arts that alternative (yet similar) equations can be used in some embodiments to determine the standard deviation of the Gaussian distribution of acceptable values of the metric based on the IV parameters {r}.

In some embodiments, "trend" or "growth" parameters are elicited. For example, a growth rate parameter {g} is derived in some embodiments. It will need to be determined what growth rate is acceptable and what growth rate is unacceptable.

Elicit "Trend" or "Growth" (Slope) parameter {g}:

Per day growth rate (g) 0<=g<=g_max (g_max=0.005->15% increase over 30-day period). The question that needs to be addressed is whether such a growth rate is acceptable or whether it should it be higher or lower than the determined growth rate.

Acceptable Gaussian Health Parameters

Acceptable Gaussian Health Parameters are Determined for a Given IV.

One example IV is set forth below for an AP CPU resource utilization (or usage).

Exemplary parameters derived for a selected resource {r}, where {r}={AP, CPU resource}
- {r}: U_B=0.9, L_B=0.6.
- m=0.75
- Stdev=(0.9−0.75)/1.645=0.091
- Slope (g)=0

Figure 4:
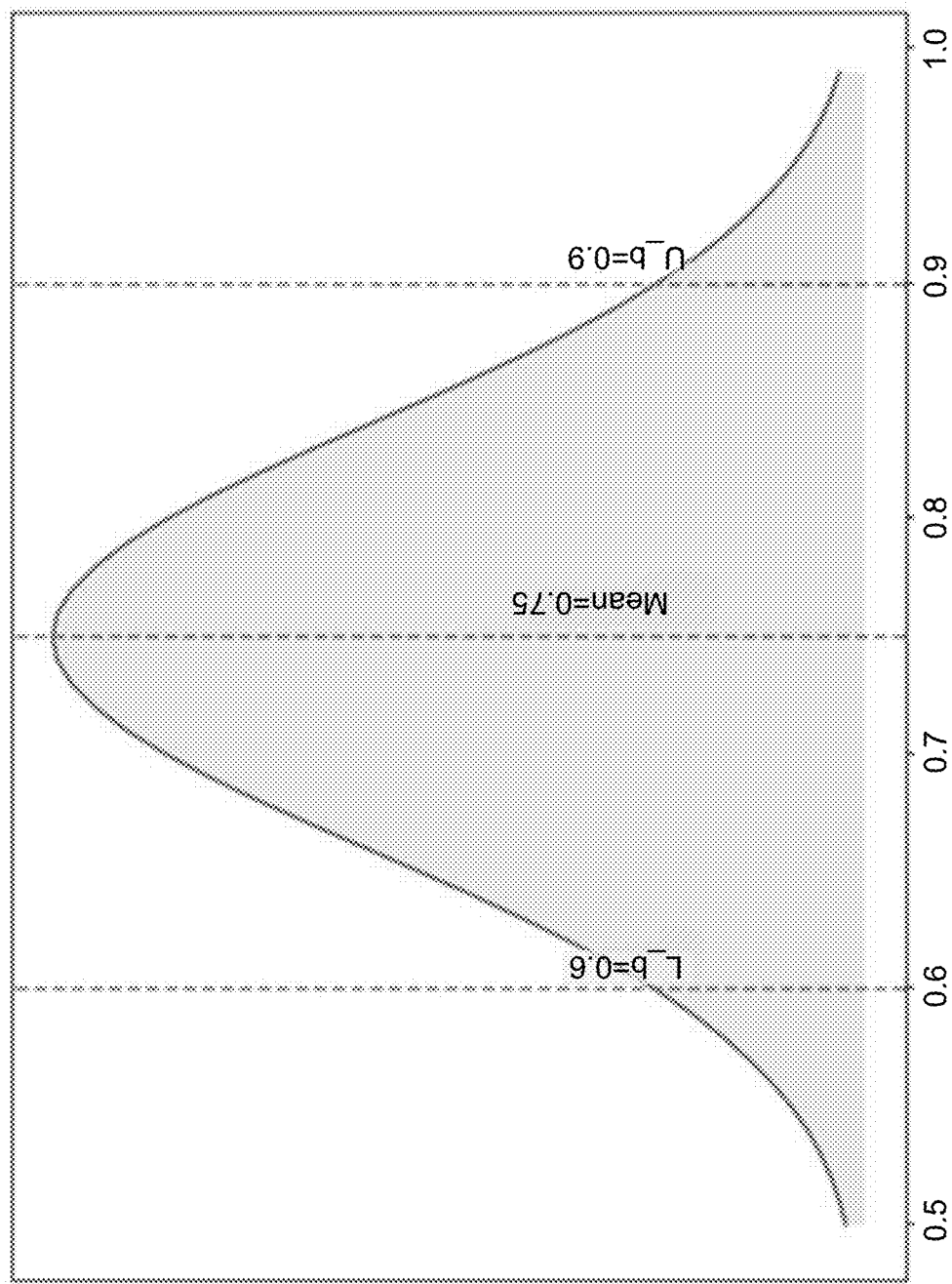
FIG. 4 illustrates an example of a Gaussian distribution of health parameters for a selected AP CPU resource utilization or usage.

FIG. 4 illustrates an example of a Gaussian distribution of health parameters for a selected AP CPU resource utilization or usage. Values that fall below L_b (equal to 0.6) are of no concern. Values between the L_b (equal to 0.6) and the U_b (equal to 0.9) are acceptable health parameters for this particular AP CPU usage. Indicator values that fall beyond the U_b (equal to 0.9) are unacceptable health parameters for this particular AP CPU usage. As noted above, other methods can be used to identify the health parameters in some embodiments. For example, these parameters could be derived in some embodiments from simulations, lab tests, and/or field trials. They might also be determined based upon data generated by network elements determined to be "good health" network elements in a similar site or enterprise network. In the event that simulations, lab tests, field trials or other "good health" parameters are available more complex Gaussian Health parameters may be calculated.

Eliciting Parameters for Poisson Distribution of an Indicator Variable

As noted above, a second exemplary method is used to derive a Poisson distribution that can be applied to "count-related" IVs such as number of service rejections or number of service preemptions per time unit. In some embodiments, this is achieved by eliciting the recent {r} parameters, consisting of a single upper bound (U_b) parameter for the indicator variable. In these embodiments, the U_b relates to rejection or preemption counts per time unit.

In one example, the U_b comprises a k th percentile of acceptable service reject/preemption count. Consistent values that exceed the U_b (upper bound value) are threshold violations, which can lead the network to unacceptable states (e.g., SLA violations) and is therefore not desired. For example, this might be equivalent to the of $95^{th}$ percentile (k=95) of acceptable values.

In some embodiments, parameter lambda (L) is derived for a Poisson distribution of acceptable values of the service rejection/preemption count IVs. For example, in some embodiments PoissonCDF(x=U_b, lambda=L)=k/100; the corresponding inverse CDF provides value for L, for example: InverseGamma(L+1, k/100) or other numerical methods for deriving L may be utilized in some embodiments. In addition to L, the parameter L_b is derived as PoissonCDF(x=L_b, lambda=L)=0. Values falling below this lower threshold L_b are assumed to be healthy. IV values between the Lower bound (L_b) and the Upper bound (U_b) are considered to be in a "watch" mode for further monitoring.

As described above with reference to the method for eliciting parameters for a Gaussian distribution of resource health parameters, a "growth" (or "slope") parameter, {g}, is also elicited in some embodiments of the method for eliciting parameters for a Poisson Distribution of resource health parameters. For example, the Growth (Slope) parameter {g} may, in some embodiments, comprise the following:

Per day growth rate (g) 0<=g<=g_max (g_max=0.005->15% increase over 30-day period). As with the method for eliciting parameters for a Gaussian distribution of resource health parameters, the question that needs to be addressed is whether such a growth rate is acceptable or whether it should it be higher or lower than the determined growth rate.

Identifying Parameters for Acceptable Resource Health—Other Methods

As noted briefly above, the recent {r} and growth {g}, the parameters for acceptable/good health distribution of a metric can be obtained in some embodiments via semi-supervised or supervised methods for labeled data for "acceptable health". For example, the data may be gathered in simulations, laboratory tests, and/or via field-trials. Data may also be gathered from network resources used in similar network deployments. Additionally, data may be obtained from the same site or enterprise network, or from enterprise networks operating under similar operating conditions.

Calculating a Distance Metric "d" Representative of Symptoms Observed at Network Elements for Resource Issues—Quantifying Resource Healh As described above with reference to the method 300' of FIG. 3, a distance metric d is calculated for each combination of {network element type, resource type}. The distance metric d is indicative of resource health parameters of a network element and observed symptoms for the corresponding resource issues. For each network element and associated and corresponding resource type, a distance (d) is calculated wherein d is representative of the network element symptoms observed for resource issues related to each network element. The distance metric d is calculated based on the distance measure between observed and acceptable resource health values for the indicator variables associated with the resource type at the network element. Note that there could be multiple IVs monitored per resource type.

The more severe the observed resource health symptoms of a given network element is, the higher the metric d value becomes.

Accordingly, for each {network_element, resource_type} a distance (d) metric is generated which is representative of symptoms observed for a combination of indicator variables. In general, a distance metric (d) is a symmetric metric that relates to an objective difference between 2 entities. In this particular case, the metric distance (d) comprises the distance between "good" health parameters and "observed" health parameters. The metric takes into account trends in long-term values. This allows the metric to indicate when an IV is worsening over time. In some embodiments of the present method and apparatus, the custom distance metric (d) is determined as follows: the custom distance metric comprises d=f(d_R, d_T), wherein the custom distance metric is a function of d_R=distance metric from recent data normalized per time unit and d_T=distance metric for trends in observed values normalized per time unit. Thus, the custom distance metric (d) takes both recent and trending data into account. The distance metric d_R could be derived from divergence (ex: "Jensen-Shannon divergence") between the expected versus observed distributions. In some embodiments, parametric/non-parametric methods may be used to estimate trend fit lines in observed values. In some embodiments, the d_T distance can be estimated between ideal trend line parameters and observed trend line parameters.

Overall Logic for Distance Calculation

In some embodiments, the overall logic used to calculate the distance metrics described above is performed as follows. Pre-processing is first performed to generate utilization data (between "0" and "1"). For example, 5-minute CPU utilization for busy hours over the previous 30 days may be obtained. In some embodiments, it is desirable to ensure that values falling below the lower bound (L_b) do not penalize the distance calculation. In accordance with this embodiment, the number of values falling below L_b is counted (L_b=C_L_b). If there are large number of values below L_b, such that C_L_b is sufficiently large, the values falling below L_b are either eliminated or replaced with samples from the "good health" distribution. As a result, under this scenario, there is no penalty from the large number of values falling below the lower bound L_b. As described above, the distances d_R and d_T are then normalized over a selected period of time (for example, normalized per day). In accordance with this technique, d_R=Normalized distance observed on recent data; D_R="Jensen-Shannon divergence" (or a similar method to calculate distance between probability distributions) on expected vs. observed values over recent data. The value (D_R) is then normalized over a certain time period, as in, for example, a selected number of days, yielding the distance metric d_R as follows: d_R=D_R/num_days. This normalization procedure is important so that the distance metric d_R can be reasonably compared with the distance metric d_T and allowing the two distance metrics to be combined.

Accordingly, d_T=normalized trend data observed on historic data (for example, the previous 30 days). Well-known statistical techniques such as the "Mann-Kendall" test can be used to derive a trend fit. A trend fit line can be obtained which provides what is known as a "Sen" slope for each sample. The Mann-Kendall test and Sen slope are well known statistical analysis techniques. If the test statistic is sufficiently significant, then D_T=fitted trend estimated from the Sen slope. The distance metric d_T is then normalized as follows: d_T=D_T*samples_per_day.

In some embodiments, the normalized distance metric may comprise a weighted combination of recent and trend parameters, as follows: d=weight_R*d_R+weight_T*d_T. As described below in more detail, the normalized distance metric d (whether weighted or not) are used to "score" the performance of network elements. The weighting of the metrics d_R or d_T can be used if we wish to weight recent or trend parameters more heavily or less heavily. For example, the value of weight_T value can be greater than that of weight_R value if it is desired to weight trend data more heavily than recent data.

A more generic embodiment of the overall logic that may be used to calculate the distance metric d is now described. This embodiment is more generic than others described in the present disclosure. A set of IVs (e.g., "set I") can be identified and used to calculate the distance metric d. For example, an IV set, I, for a selected AP and for the resource "capacity" can be selected as follows: {AP, capacity}={PRB utilization, ERAB reject count, RRC reject count. The distance metric d can be derived in accordance with the following equation: d=f(d_R_i, d_S_i) for each i in the IV set "I".

During pre-processing, for example, wherein rn-min (m=10) averaged for busy hours, the distance metric d_R_i is calculated as follows: d_R_i=distance per t from r_days for indicator variable i. As described above in the other method, the number of values following below the lower bound L_b is counted: Count number of values below L_b=C_L_b. Next, the values following below L_b are eliminated and replaced with samples drawn from the "acceptable health" distribution samples. Non-parametric "Jensen-Shannon divergence" (or a similar method to calculate distance between probability distributions) between the acceptable distribution vs. observed values is performed as described above. This data is then normalized over a selected time period (e.g., per day).

A distance d_S_i=distance per t on from the slope in g_days is determined for each indicator variable i. Parametric and non-parametric methods can be used to estimate a trend fit line in the observed values. The distance in slope between an ideal and observed parameters can then be estimated using, for example, the above-referenced well-known "Mann-Kendall" technique to derive a fitted slope from the Sen slope, which is then normalized per day. The distance metric "d" for the {network element, resource type} is then determined in accordance with the following equation: d=f(weight_R*d_R_i+weight_S*d_S_i). f( ) is a function such as simple (or weighted) average or maximum across all IV i.

Figure 5:
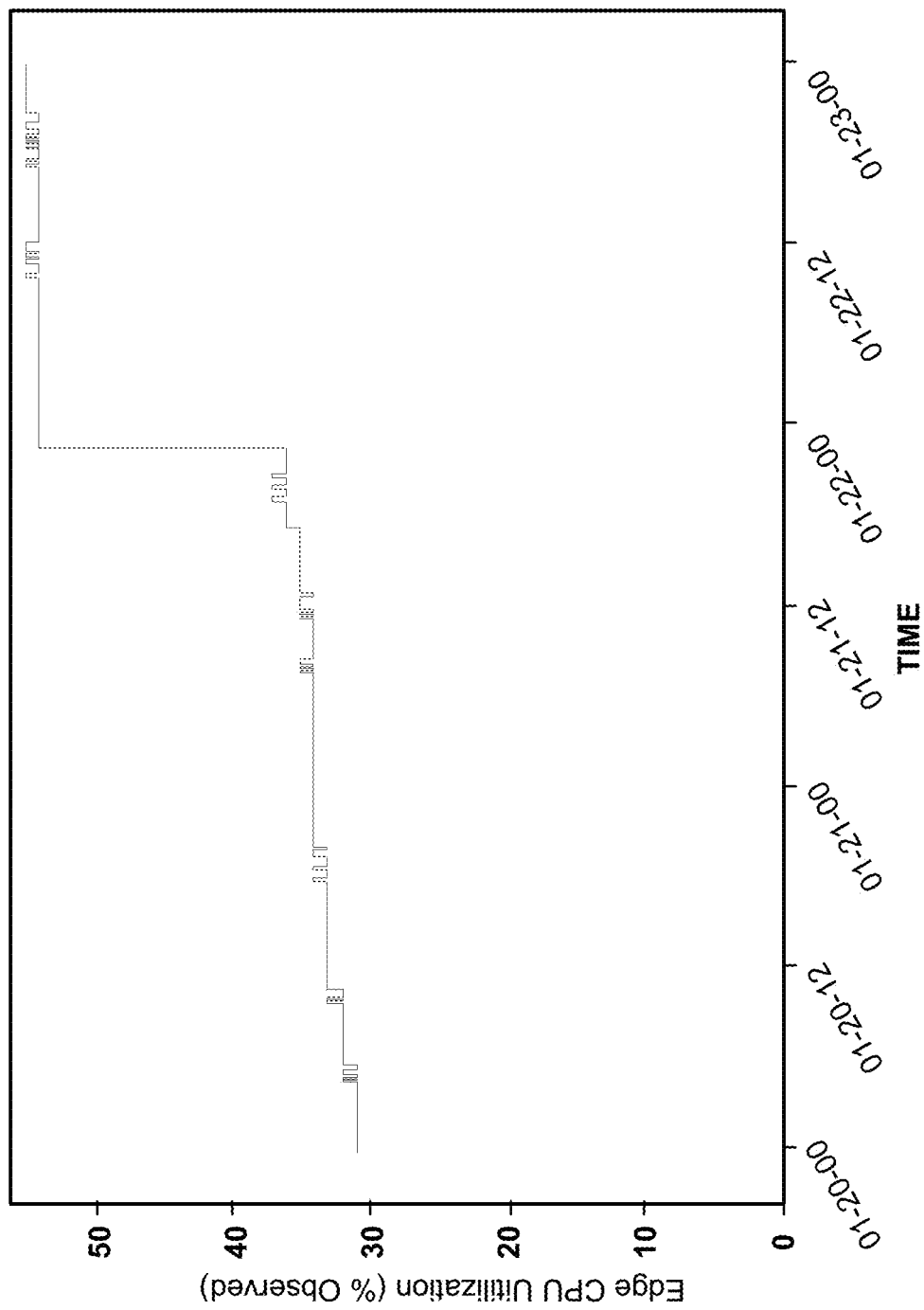
FIG. 5 shows an example of Edge CPU utilization data obtained from observed data over time (from Jan. 20, 2000 through Jan. 23, 2000) in an example deployment.

FIG. 5 shows an example of Edge CPU utilization data obtained from observed data over time (from Jan. 20, 2000 through Jan. 23, 2000) in an example deployment.

Figure 6:
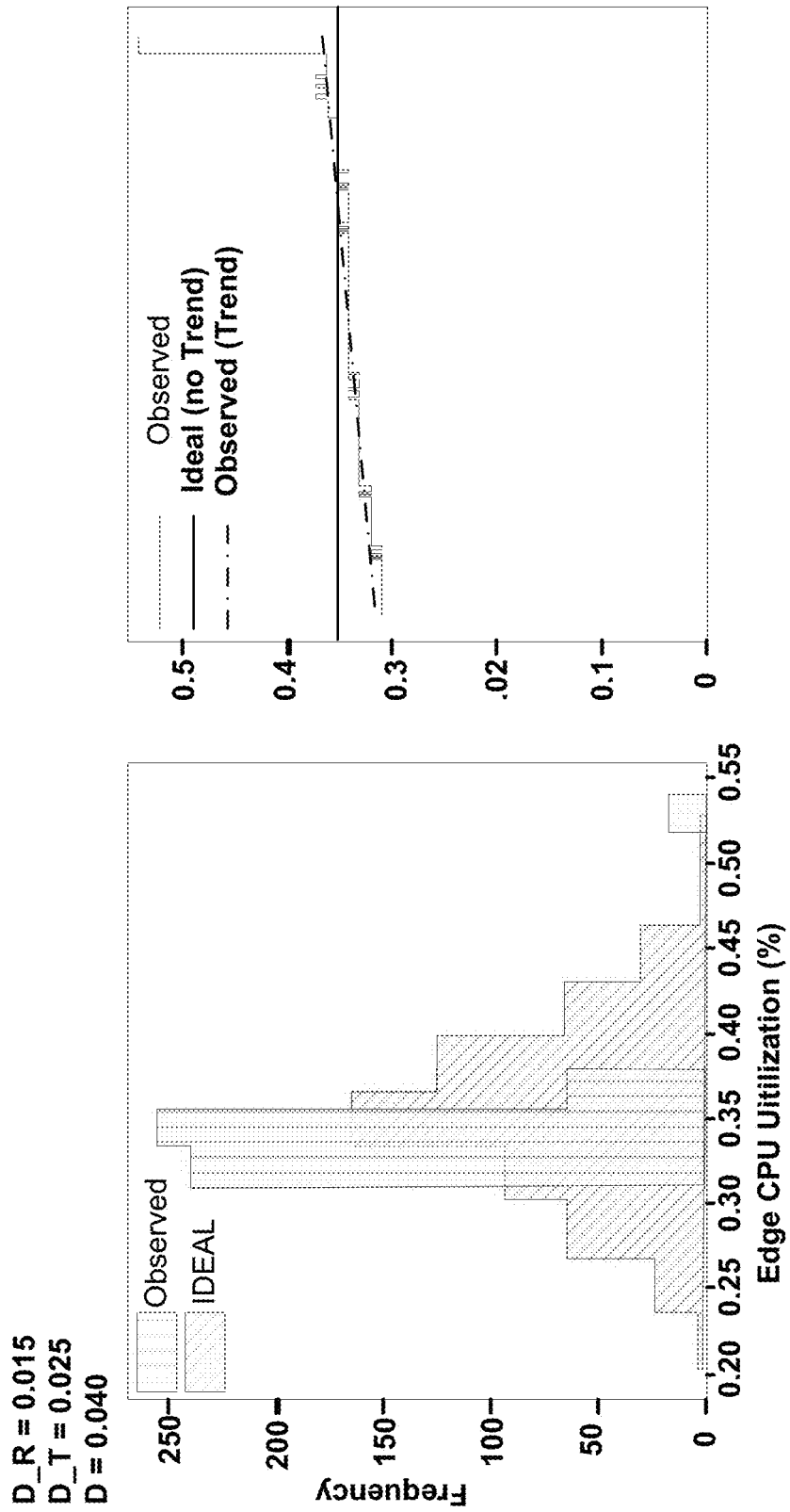
FIG. 6 shows an example of an application showing a distance metric d which is calculated for the edge CPU utilization percentage from observed data in an example of a deployment versus Frequency.

FIG. 6 shows an example of an application showing a distance metric d which is calculated for the edge CPU utilization percentage from observed data in an example of a deployment versus Frequency. In this example, the distance metric, d=0.04, and is obtained from observed data taken from January $20^{th}$ to January $21^{st}$. The CPU utilization percentages shown between approximately 0.25 and 0.47 (%) show acceptable values obtained for the calculated distribution of Gaussian health parameters having a mean of 0.35 and standard deviation of 0.05. The observed data is shown as occurring between a little more than 0.30 CPU utilization percentage to approximately 0.38 CPU utilization percentage, and with some observed CPU utilization observed data between 0.50 and 0.54. So, as shown in FIG. 6, only very small instances of observed data occur beyond the range of the acceptable values (between 0.50 and 0.54 of percentage of CPU utilization). As shown in FIG. 6, the distance metric d_R based on a Gaussian distribution with a mean of 0.35 and a standard deviation of 0.05 is equal to 0.015. The distance metric d_T based on a trend fit with intercept 0.35 and a slope=0 is equal to 0.025. The final distance metric d is equal to 0.04 in this example.

Figure 7:
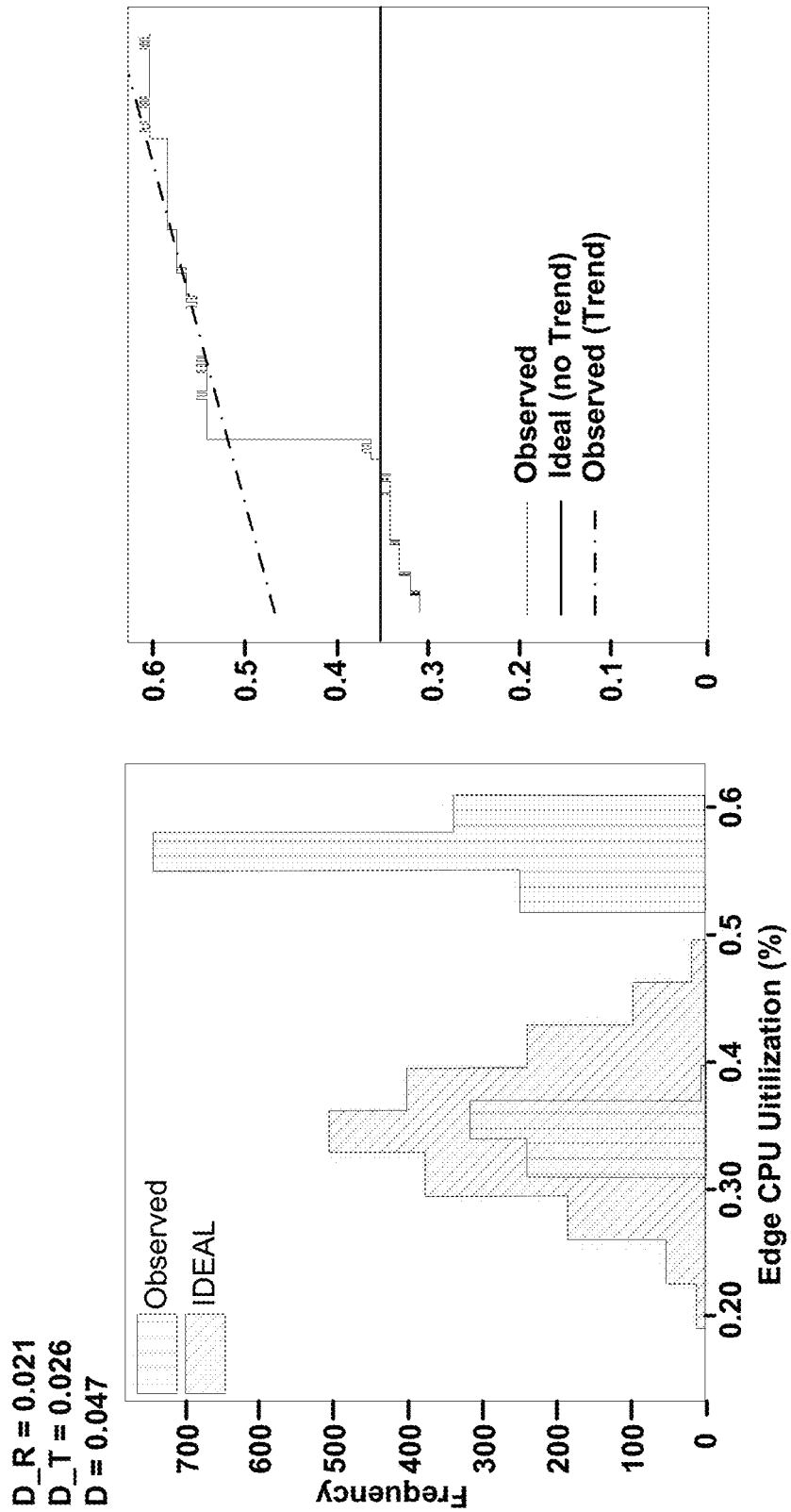
FIG. 7 shows another example application showing a distance metric d which is calculated for the edge CPU utilization percentage from observed data in an example of a deployment versus Frequency.

FIG. 7 shows another example application showing a distance metric d which is calculated for the edge CPU utilization percentage from observed data in an example of a deployment versus Frequency. The CPU utilization percentages shown between approximately 0.18 and 0.48(%) show acceptable values obtained for the calculated distribution of Gaussian health parameters. While some of the observed CPU utilization values occur within the acceptable range of values, more observed data values exist beyond the acceptable health value range (specifically, more observed CPU utilization percentages exist between 0.5 and 0.64 edge CPU utilization percentage ranges than are present in FIG. 6). Therefore, the calculated distance metric d is higher than that determined for the observed CPU percentage values of FIG. 6. Specifically, d_R is equal to 0.021, d_T=0.026, and the final distance metric d=0.047 (as compared with the distance metric d=0.04 as shown in FIG. 6). As shown in FIG. 7, the CPU utilization percentage values shown in the FIG. 7 are obtained from observed data taken from January $20^{th}$ to January $26^{th}$.

Figure 8:
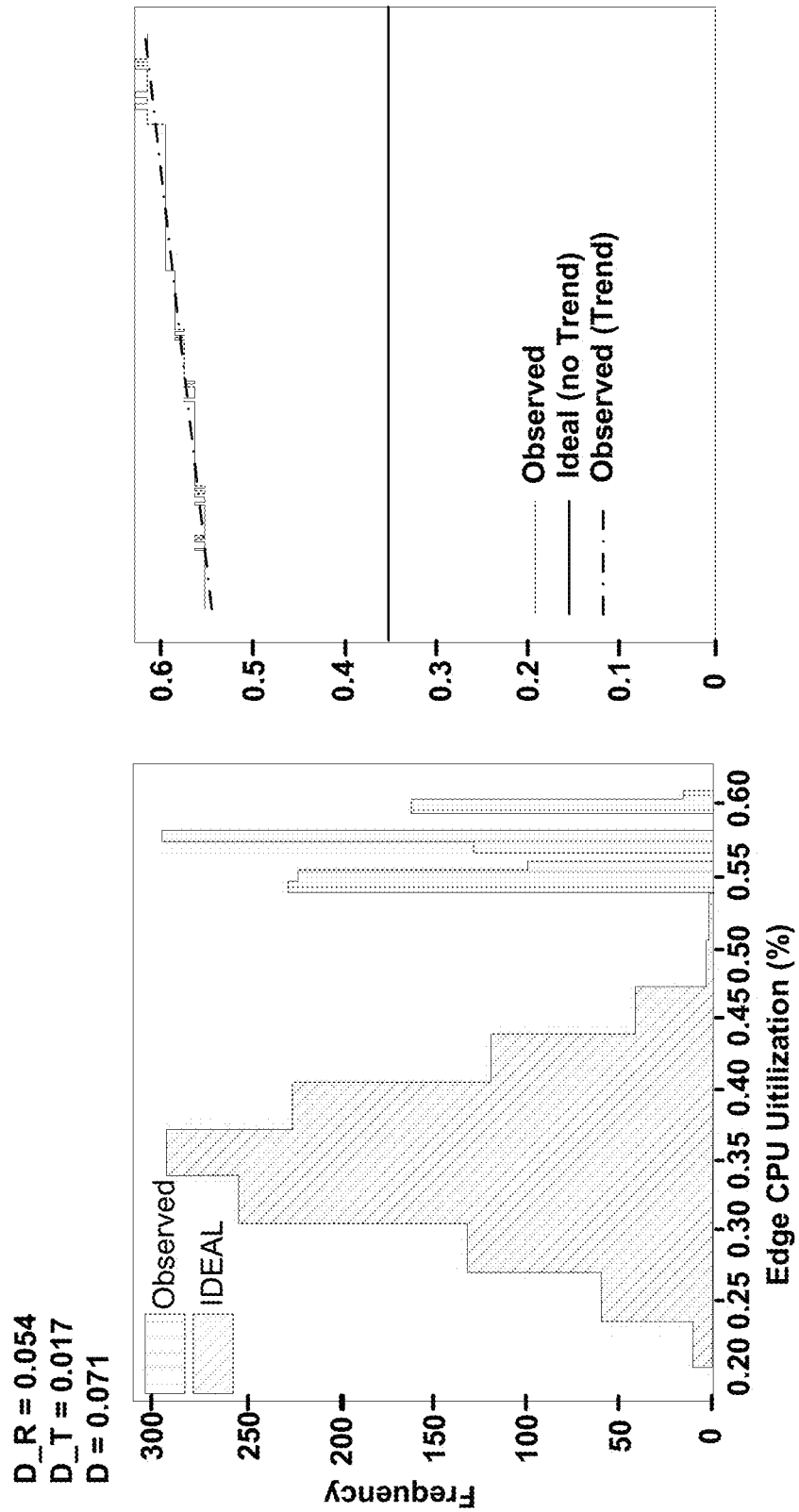
FIG. 8 shows yet another example application showing a distance metric d which is calculated for the edge CPU utilization percentage from observed data in an example of a deployment versus Frequency.

FIG. 8 shows yet another example application showing a distance metric d which is calculated for the edge CPU utilization percentage from observed data in an example of a deployment versus Frequency. The CPU utilization percentages shown between approximately 0.21 and 0.54(%) show acceptable values obtained for the calculated distribution of Gaussian health parameters. Note that none of the observed CPU utilization values occur within the acceptable range of values, with more observed data values occurring at between 0.54 and 0.65 edge CPU utilization. Therefore, the calculated distance metric d is higher than that determined for the observed CPU percentage values associated with FIGS. 6 and 7. Specifically, d_R is equal to 0.054, d_T=0.017, and the final distance metric d=0.071 (as compared with the distance metric d=0.04 as shown in FIG. 6, and d=0.047 as shown in FIG. 7). As shown in FIG. 7, the CPU utilization percentage values shown in the FIG. 7 are obtained from observed data taken from January $22^{nd}$ to January $25^{th}$.

So, as can be seen by observing the calculated final distance metrics "d" for the observed CPU utilization percentage values in the examples shown in FIGS. 6, 7 and 8, the final distance metric, d, increases when the observed data falls beyond the range of acceptable network health parameters. Therefore, the distance metrics d indicate how much observed network health values differ from acceptable network health parameters. The higher the distance metric d becomes, the further away are the observed values from acceptable network health parameters.

The metrics d for each network element in an enterprise network assists the network developer and deployment designer to determine which network elements to focus on with regard to possibly having network resource problems. These metrics help in determining which network elements are having the most resource issue problems from a planning perspective. These metrics are then used to Rank Network Elements based on Observed Network Issues which is described now.

Ranking Network Elements Based on Observed Network Issues

The ranking of network elements based on observed network issues process begins in some embodiments by identifying all of the network elements in the enterprise network. Next, a logical group of network elements of interest is identified. For example, all network elements in a selected site could be logically grouped together. The network elements in that logical group can then be ranked in accordance with network resource utilization. For example, for each network element type (for example: "AP", "Edge"): determine $S\_ne=\max(d\_i$, across all $d\_i$ for this network element). Note that a $d\_i$ corresponds to a {network element, resource} as described above. The ranking of network elements based on observed network issues can then be performed by ranking them by descending order of $S\_ne$ amongst all network elements of this type in the logical group. In some embodiments, the top N network elements having network resource issues are then identified for further analysis.

The value of N can be configurable, and in some embodiments configurable by a network designer via the user interface (UI) such as the UI/API 116 (see, e.g., FIG. 1). In some embodiments, a configurable threshold for the distance metric d (d_threshold) that may also be determined from observed data such that only those $d\_i$ values above the d_threshold are considered when determining $S\_ne$.

Different groups of network elements can be ranked based on observed resource issues, across a logical group of network elements. For example, APs in site A vs. APs in site B, etc. So essentially, the distance metric d provides a tool that can be used to identify network elements having network resource issues, and a threshold value d_threshold can be used to identify the most impacted network elements having network resource issues. This allows us to identify the top network elements to focus attention upon.

Cluster Resource Indicators

Cluster Resource Indicators at a Network Element

Different indicators of resource issues observed at a network element may be correlated. For example, AP CPU utilization, AP PRB utilization, AP service reject count, AP service preemption count may all be correlated for an AP network element. In another example, in the Edge, the Edge backhaul network utilization and Edge CPU utilization indicators may be correlated. If such network resource issue correlation is occurring within a given network element, we can cluster resource indicators for a given network element, together with determining scores for each cluster. The cluster determination may, in some embodiments, be made depending upon how closely correlated the indicator variables at the network element are.

Clustering of indicator value series at a selected network element is a pre-processing step which reduces a number of combinations considered in the next processing step (identifying factors contributing to the resource issues observed at this network element). Well-known clustering techniques and algorithms can be used to develop the clusters per network element type. For example, hierarchical agglomerative time-series clustering methods, using a distance metric that considers covariance (for example, using a "Mahalanobis" distance metric) and linkage method such as "Single/min" distance allows resource issues that are most similar to be clustered. Standard statistical mathematical techniques can be used to identify goodness-of-fit for the clusters.

From identified clusters only those clusters that contain at least one of the top N resource issues are considered. As noted above, these clusters are then scored as follows (1) Score each of the n_clusters: $S\_c$; wherein $S\_c=\max(d\_i)$ across all resources in the cluster c.

In other embodiments, information about the clusters is obtained such as identifying indicator variables that tend to cluster more often. Future clustering can be optimized based on such observations.

Rank Factors Contributing to Resource Issues

In some embodiments, a next step is performed to identify significant contributing factors responsible for a resource issue at a given network element. One objective is to determine what are the significant factors contributing towards a particular indicator variable's high d value. These factors are contextual and vary with the network element. Examples of differing network resource issues associated with differing network elements are: an Edge suffering from congestion, an AP #1 suffering from bad SINR of connected devices, AP #2 suffering from high traffic volume, etc.

This method identifies two types of factors that contribute to resource issues at a network element. (i) Factors from general network usage growth and (ii) factors that relate to unstable resource availability. For the latter, some percentage of the network resources may not be available for different time durations, and this will have an impact on the resource indicator variable values. Examples include, channel available for use at a CBSD may drop to 10 MHz from 20 MHz, nodes may be unavailable in a multi-node edge cluster deployment etc.

For both types of factors, assistance from domain experts can help to create a curated look-up table of potentially influencing factors. This step can be performed "off-line", and as a result of this assistance, a look-up table of factors responsible for resource issues can be created. In some embodiments, the look-up table comprises a table of factors for each pair of {network_element_type, indicator_variable} network element types and associated IVs. A factor (is an independent variable) is a measurable quantity that impacts an indicator variable (which is a dependent variable). A factor could be measured on the same network element, or it could be measured on different network elements (for example, an AP resource can be influenced by a factor measured at an edge).

An interesting issue when describing factors contributing to network resource issues is correlation versus causation. As described above, using the presently disclosed method and apparatus correlations can be identified, clustered, and ranked. Because correlation does not imply causation, the method incorporates a domain-expert curated look-up table. Automatic methods for inferring the independent variables (factors) are possible, and such factors may be exposed via UI to a domain expert for further inclusion into the look-up table. This iterative process will evolve the information contained in the look-up table over time.

Table 1, set forth below, shows a table of factors of type (i)—those due to general network usage growth:

TABLE 1

~~Exemplary~~ Look-up Table of Factors from a Resource Planning Perspective

{AP, RRC reject count}: Service request rate (number of devices trying to attach per unit time)
{AP, ERAB reject count}: ERAB-GBR request rate, ERAB-Non-GBR request rate (number of devices requesting services per unit time)
{AP, Service preemption count}: Incoming request rate of higher priority flows
{AP, PRB utilization}:
 Number of devices with traffic TABLE 1-continued ~~Exemplary~~ Look-up Table of Factors from a Resource Planning Perspective Radio condition: Average/percentile of SINR/CQI for devices with traffic
Traffic volume on default bearers
Traffic volume on dedicated bearers
{Edge, CPU/memory/network utilization}:
 Number of APs supported
 Number of devices with traffic
 Traffic volume from attached devices In some embodiments, for a dynamic resource, the following factors that drive unstable resource availability (type 2 described above) are considered:

(1) Resource availability per unit time; amount of resource currently available for use/total resource expected to be available for use: For example, Capacity at an AP: for example, only 10 MHz of spectrum is available instead of 20 MHz of spectrum; Another example of this resource availability factor that drives unstable resource availability is Edge CPU/memory: single node down in a 3 node cluster.

(2) Fluctuation in resource availability per unit time=count of resource upgrade+downgrade or downgrade+downgrade event pairs observed per unit time (downgrade=whenever resource availability is less than 100%). Higher fluctuation in resource availability increases unstable service conditions—for example: fluctuating service rejection and preemption rates.

Quantify Factors' Impact on Resource Issues:

In some embodiments of the present method and apparatus for scalable ML-based Frameworks for Resource Planning in Enterprise Networks, a method is undertaken in order to quantify how much each influencing factor contributes to a particular observed resource issue for a given resource network element. In one such embodiment, this information can be derived from mutual information and/or in combination with well-known correlation analysis techniques such as the well-known "Spearman/Kendall" correlation analysis technique. For example, for a resource issue such as "high PRB utilization at an AP", each of the factors associated with the high PRB utilization at an AP are quantified. Factors associated with the high PRB utilization at an AP, may be, for example, traffic volume, SINR, CQI, number of active users, and spectrum availability. This quantifying step is performed to identify the most significant factors causing the resource issues observed in a selected network element in the enterprise network.

The set of features to examine for a selected indicator variable is described in more detail above. In addition, when performing this quantifying process, it is important to acknowledge the possible existence of unmeasurable/unknown features that can contribute to network resource symptoms. For example, software bugs might exist which cause memory leaks and therefore produces increases in memory usage at an Edge or AP. The unmeasurable/unknown features can dilute the relationship between a factor and its associated indicator variable. Therefore, the disclosed method and apparatus must be sufficiently robust to identify such unmeasurable/unknown features.

Method to Quantify a Factor's Impact on a Resource Issue Cluster

In some embodiments, the following method is used to quantify a factor's impact on a resource issue cluster. In accordance with this method, for each network element, and for each cluster in network element, select resource issues, R, with d_i>d_threshold. For multiple such resource issues per cluster, select a single resource issue per cluster (ex: one max d_i or one with maximum number of factors in lookup table etc.)

For each indicator variable in R:

For each factor from the lookup table for this indicator variable, calculate score (m) to determine the strength of a relationship from observed data (over a period of f_days):

Scale observed factor values between 0 and 1 (normalization or min-max scaling);

Calculate correlation metric, c (via MI, Spearman/Kendall, etc.) along with p-value (as described above using well-known correlation determination techniques). The null hypothesis is that no relationship exists between the factor and the indicator variable.

The null hypothesis is rejected when calculated p-value is low (ex: p-value less than 0.01 or 0.05). In such cases, because of domain knowledge, the data provides evidence of the factor affecting values of the indicator variable, and the score/strength of this relationship, m, is determined as, m=absolute value of the correlation metric, c. The indicator variable, factor, and associated score (correlation strength) in is then added to a list or set, S. The set S denotes the set of {indicator variable, factor, score} with significant impact on the resource's issue.

The list or set S is then sorted by the score m. If the list or set S is empty, or if max(m) in the list is less than a selected minimum in threshold (m_threshold), then alert the possibility of the existence of unknown/unmeasurable factors for the causation of the associated indicator variable. As before, in some embodiments, "threshold"-based validation is used as a starting point. The threshold can be adapted with training.

Figure 9:
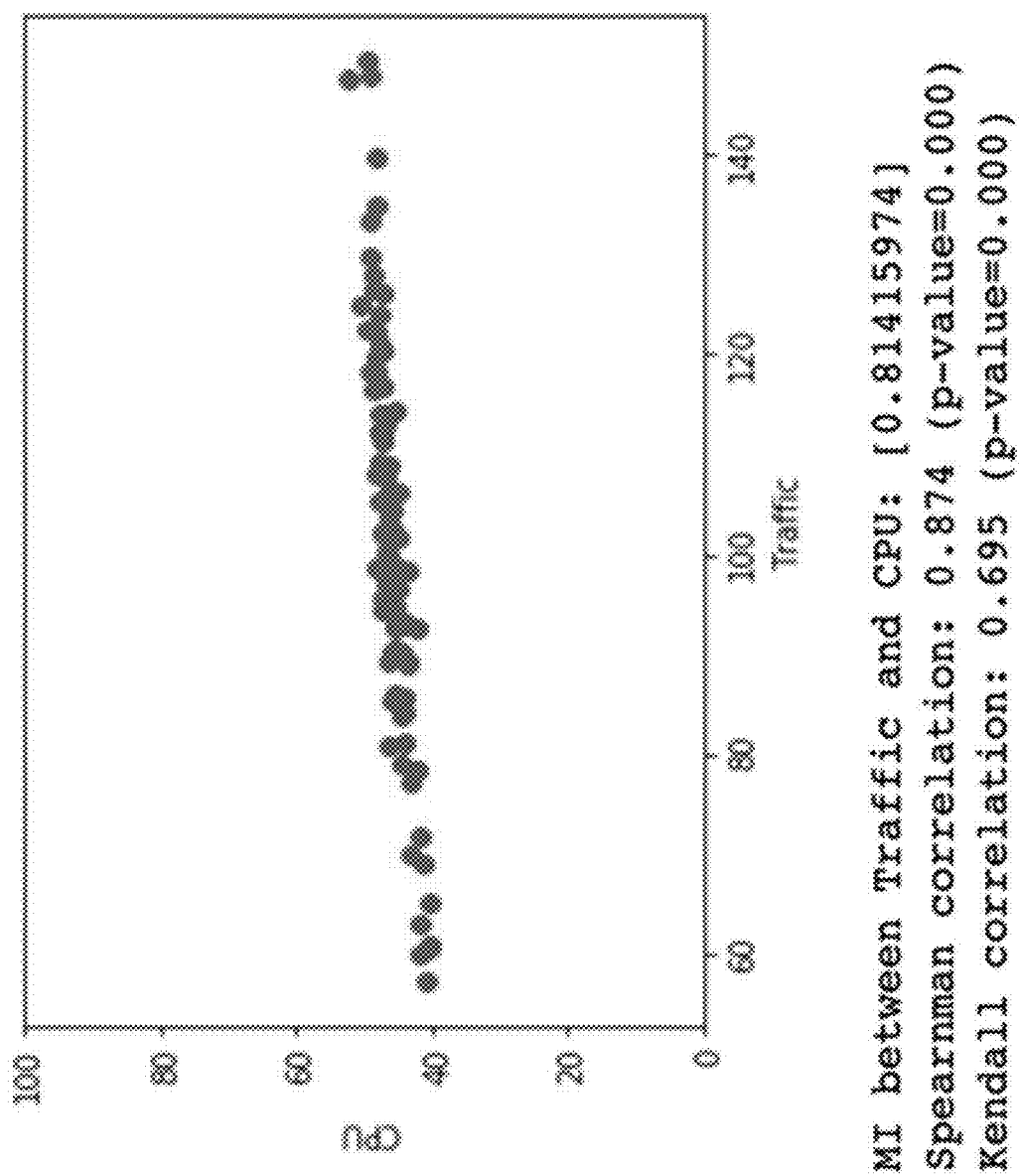
FIG. 9 shows the strength of relationship between an indicator variable (for example, CPU utilization) and one of its influencing features (or factors) (for example, "Traffic") using sample data.

FIG. 9 shows the strength of relationship between an indicator variable (for example, CPU utilization) and one of its influencing features (or factors) (for example, "Traffic") using sample data. FIG. 9 shows the very high correlation between the indicator variables (CPU utilization) and an influencing factor (traffic), resulting in a high score m for the correlation between these two values, and a very low p value (p=0.000) in this scenario.

Quantifying Significant Features—Example 2

Figure 10:
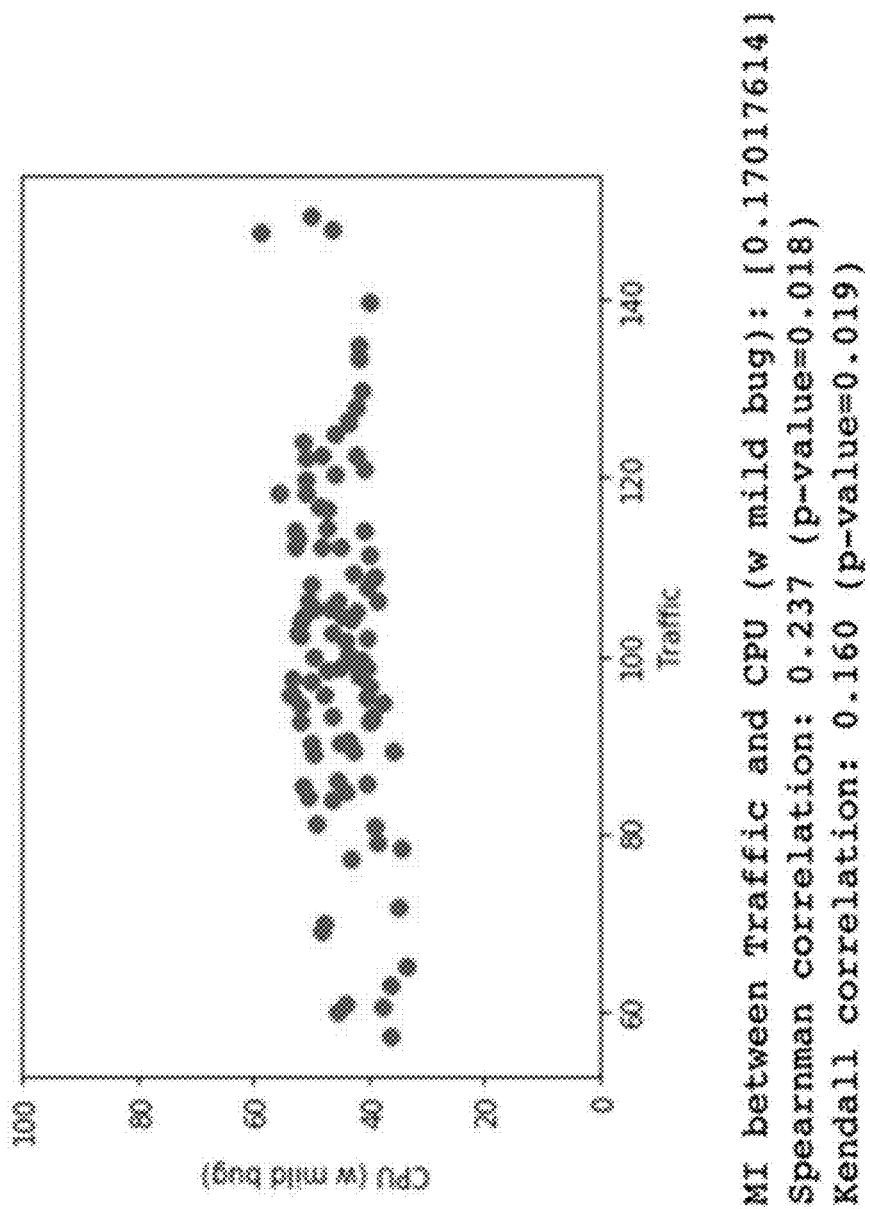
FIGS. 10 and 11 show the differing strengths of relationship between an indicator variable (e.g., CPU utilization) and one of its influencing features (or factors) (e.g., "Traffic") using sample data.
Figure 11:
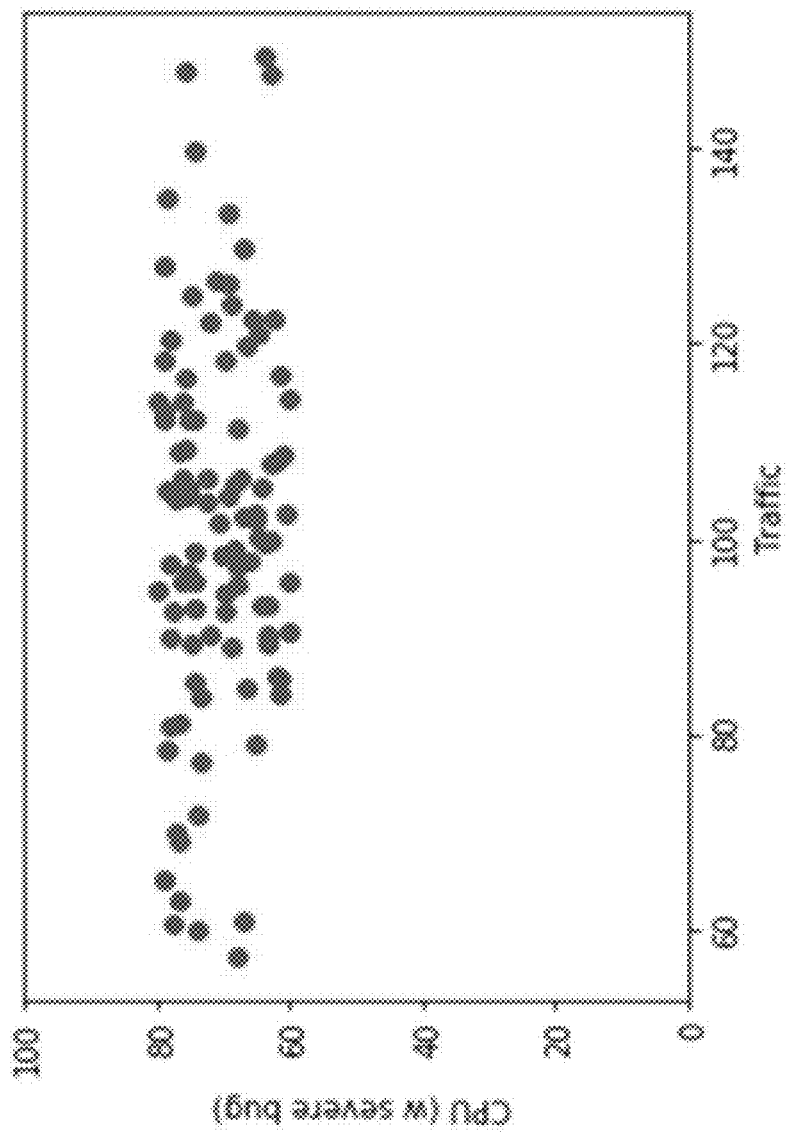

In contrast to the plot shown in FIG. 9, FIGS. 10 and 11 show the differing strengths of relationship between an indicator variable (e.g., CPU utilization) and one of its influencing features (or factors) (e.g., "Traffic") using sample data. Note the potential changes to strength of relationship or correlation between the resource usage value (CPU utilization) and the potentially influencing factor (traffic) when experiencing a mild software bug, as shown in the FIG. 10, and when experiencing an increasing impact from an unmeasurable feature or factor (when experiencing a severe software "bug") as shown in FIG. 11. Mild impact from an unknown unmeasurable mild software bug, as shown in FIG. 10, lowers the MI/correlation score (m). Severe impact from a severe software bug, as shown in the FIG. 11, further lowers the m score and makes the relationship insignificant (and accordingly has increased and relatively large p-values). It is important that the disclosed method and apparatus flag these types of scenarios to prevent from making unwise or incorrect planning recommendations/suggestions.

As can be seen from viewing the plots shown in FIGS. 10 and 11, there is very little correlation between variations in traffic and CPU utilization. This is because the CPU utilization is being much more impactfully influenced by the mild (FIG. 10) and severe (FIG. 11) software bugs than it is by the volume of traffic. Again, the present method and apparatus advantageously flags these types of scenarios where unknown or unmeasurable factors (in this case, a "software bug") influence or cause the observed indicator variables. This avoids making false or incorrect conclusions and incorrect resource planning recommendations.

Resource Planning

Planning Decisions—

In some embodiments, the objective of ranking factors that affect the observed IVs generated at such network elements is to make informed planning decisions and recommendations regarding the affected enterprise networks. Such decision planning systems take as input the identified resource issues, and factors contributing to the observed resource issues (among other things) and determine a correct set of planning options and alternatives to address the observed resource issues. Planning options can be generated for a logical group of network elements (for example, a site, or enterprise), a selected group of elements (for example, all APs in a site or even all CBSDs in the site) or for individual resource elements.

Such planning decisions and recommendations might, in some embodiments, identify factor-specific planning alternatives for each network element (this could be performed "off-line" in some embodiments). In this example, the planning recommendation may comprise the following: <network element type, resource type, factor>: {option A, option B, . . . option K, etc.}.

For example, for a network element AP (such as AP 102 of FIG. 1, for example), and the network resource (capacity); i.e., for {AP, capacity}, the following recommendations may be made depending upon the factor identified as causing the network resource issue:

(1) Increases in admission requests: Recommendation: Limit access to specific devices/groups; Increase sectors.
(2) Increases in traffic volume: Recommendation: Limit access to specific devices/groups; increase sectors; develop traffic shaping config; perform dedicated bearer reconfiguration.
(3) Worsening SINR/CQI: Recommendation: Frequency planning, spectrum reconfiguration and/or frequency reuse on the AP based on current intercell interference or path loss conditions.
(4) Spectrum instability: Recommendation: spectrum reconfiguration, frequency re-use across selected APs at the site, increase sectors, perform traffic shaping configuration, perform dedicated bearer reconfiguration.

In another network element example, for an Edge:
(1) CPU/memory utilization: Recommendation: Upgrade form factor, create correct sizing of cloud instances
(2) CPU/memory instability: Recommendation: change and/or replace hardware.

Generating Planning Suggestions (Example 1)—Forecast-Based Recommendations

In some embodiments of the present method and apparatus, for each {network element, resource type} an estimate of the resource demand at a time instance of interest can be determined from estimated projections of the corresponding driving factors. Recommendations can then be made based on the projected demand.

In accordance with these embodiments, Bayesian methods may be used to estimate parameters of the resource demand probability distribution to quantify uncertainties in the estimated demand value. For example, in these embodiments, resource demand within specific credible intervals can be determined (for example, resource demand, d, with a 90% credible interval). Time-series based forecasting methods can be used to project growth in the values of the driving factors. A factor's growth estimates may also be incorporated in performing resource demand estimation. An example of such planning recommendations based on estimates in resource demand at a time instance of interest is set forth below for a selected AP and for the network resource "capacity".

Example for {AP, Capacity}

If the driving factor=increase in admission requests: Forecast an estimate of admission requests from devices to derive capacity demand and quantify (i) devices/groups that can be limited, (ii) estimate of additional number of sectors needed.

If the driving factor=increase in traffic volume: Forecast an estimate for traffic volume across APs to derive capacity demand and (i) quantify number of sectors, (ii) determine a traffic shaping configuration, (iii) perform dedicated bearer (re)-configurations.

In some embodiments of the present method and apparatus, simple rule-based methods may be used to generate planning suggestions and recommendations based on estimated demand. In other embodiments, risk-based methods may be employed to generate the planning suggestions. Such risk-based methods incorporate certainty in estimates and associated costs for each alternative. For each resource, costs associated with meeting the demand are quantified. One embodiment of this rule-based method is set forth below:

(a) Identify resource demand d with k % credible interval;
(b) Identify CostForNotMeeting demand, d: CNMD(d): incorporating business impact from poor network experience due to resource unavailability (for example, identify the loss of revenue from estimated SLA violations);
(c) Identify a list of alternatives A for the significant factor;
(d) for each alternative i in A, quantify a cost associated with meeting demand via this alternative. CostsForMeetingDemand, d: CMD_i(d): incorporating network downtime costs, installation costs, resource procurement cost for meeting demand d;
(e) Generate planning suggestions=sorted ({CMD_i(d) for i in A, CNMD(d)}). Planning suggestions may include alternatives that meet the demand and also the alternative of not meeting the demand; and
(f) Note that an alternative in A may also be a combination of multiple options such that each option fulfills a fraction of the demand d. Automatic methods may be implemented to optimize the demand split across the combination of options.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for determining network health assessment and providing network planning and recommendations in wireless enterprise networks, comprising:
    a) quantifying resource health of a plurality of network elements operating within an enterprise network, wherein the resource health of each of the plurality of network elements is quantified by calculating, for each network element, a plurality of distance metrics between acceptable health parameters and observed network resource health metrics associated and corresponding to each resource associated with each of the plurality of network elements;
    b) ranking each of the network elements based upon the distance metrics calculated for each network element in step a);
    c) ranking factors that negatively impact the resource health of each of the network elements in the enterprise network, wherein the factors are ranked in accordance with how severely the factors impact network performance; and
    d) providing network planning suggestions and recommendations to improve network performance of a selected network element, wherein the suggestions and recommendations are based upon the ranking of factors as determined during the step c).

2. An apparatus for scalable machine-learning (ML)-based frameworks for resource planning in enterprise networks, wherein the enterprise network comprises a plurality of network elements operating within the enterprise network, and wherein each of the network elements have associated and corresponding resource types, comprising:
    a) an offline component, wherein the offline component identifies acceptable health parameters for each resource type and for each of the network elements;
    b) a first database, wherein the first database stores the acceptable health parameters identified by the offline component;
    c) an Analytics and Recommendation component, operatively coupled to the first database, wherein the Analytics and Recommendation component: quantifies the resource health of a selected network element; ranks network elements based upon distance metrics between the acceptable health parameters and observed network resource utilization values associated and corresponding to each selected network element; ranks factors that negatively impact the resource health of each of the network elements in the enterprise network; and provides network planning suggestions and recommendations based upon the ranking of factors;
    d) a second database coupled to the Analytics and Recommendation component, wherein the second database stores output data obtained from the Analytics and Recommendation component; and
    e) a User Interface coupled to the second database.

3. A method of standardizing and ranking network resource issues associated with a plurality of network elements in a wireless Enterprise Network (EN), wherein each network element comprises one of a plurality of network element types, and wherein each network element type has a corresponding and associated set of network resources that each network element type may consume, comprising:
    a) assigning indicator variables (IVs) to associated and corresponding network resources consumed by each network element type, wherein each IV reflects one of the following:
        i. network resource utilization observed at each network element type;
        ii. service rejection count due to resource unavailability at each network element type; or
        iii. service preemption count due to resource unavailability at each network element type;
    b) defining standardized values for each IV assigned in step a), wherein the IV values are greater than or equal to 0, and wherein higher IV values indicate that an associated and corresponding network resource is more highly constrained than are network resources having relatively low associated IV values;

c) ranking factors that negatively impact the resource health of each of the network elements in the enterprise network, wherein the factors are ranked in accordance with how severely the factors impact network performance; and d) generating network planning suggestions and recommendations to improve network performance of a selected network element, wherein the suggestions and recommendations are based upon the ranking of factors as determined during the step c).

4. The method of standardizing and ranking network resource issues associated with a plurality of network elements in a wireless Enterprise Network (EN) of claim 3, wherein the IVs assigned to the associated and corresponding network resources consumed by each network element type are indicative of resource health and are calculated over a selected time period t, and wherein:

a) the resource utilization observed at each network element type=resource used/resource available; and wherein b) the service rejection count of each network element type ("count-related data") comprises service that is rejected per unit time due to a lack of available resources; and wherein c) the service preemption count of each network element type ("count-related data") comprises ongoing service that is preempted per unit time to allow for higher priority service.

5. The method of standardizing and ranking network resource issues associated with a plurality of network elements in a wireless Enterprise Network (EN) of claim 3, wherein one of the network element types comprises an Access Point (AP), and wherein the network resource consumed by the AP is capacity.

6. The method of standardizing and ranking network resource issues associated with a plurality of network elements in a wireless Enterprise Network (EN) of claim 5, wherein the IVs assigned to the AP network resource capacity comprise the following: Resource reject count (RRC, ERAB), Physical Resource Block (PRB) utilization, and Service Preemption count.

7. The method of standardizing and ranking network resource issues associated with a plurality of network elements in a wireless Enterprise Network (EN) of claim 6, wherein the IVs are tracked in order to monitor the utilization of the capacity resource.

8. The method of standardizing and ranking network resource issues associated with a plurality of network elements in a wireless Enterprise Network (EN) of claim 3, wherein one of the plurality of network elements comprises an Access Point (AP)/Edge network element type, and wherein the set of network resources associated with and corresponding to the AP/Edge network element type comprises CPU, memory, disk and network, including backhaul for the edge network element type.

9. The method of standardizing and ranking network resource issues associated with a plurality of network elements in a wireless Enterprise Network (EN) of claim 8, wherein the IVs assigned to the network resources consumed by the AP/Edge network element type comprise: {CPU/memory/disk/network utilization, packet latency, and packet drop ratio}.

10. The method of standardizing and ranking network resource issues associated with a plurality of network elements in a wireless Enterprise Network (EN) of claim 3, wherein a distribution of values of IVs are determined.

11. The method of standardizing and ranking network resource issues associated with a plurality of network elements in a wireless Enterprise Network (EN) of claim 10, wherein parameters of acceptable or unacceptable resource health are determined for the distribution of values of IVs.

12. The method of standardizing and ranking network resource issues associated with a plurality of network elements in a wireless Enterprise Network (EN) of claim 11, wherein the parameters of acceptable or unacceptable resource health are determined from data obtained from consultation with domain experts.

13. The method of standardizing and ranking network resource issues associated with a plurality of network elements in a wireless Enterprise Network (EN) of claim 11, wherein the parameters of acceptable or unacceptable resource health are determined from accumulated data related to network element resource usage.

14. The method of standardizing and ranking network resource issues associated with a plurality of network elements in a wireless Enterprise Network (EN) of claim 11, wherein the parameters of acceptable or unacceptable resource health are determined using a Gaussian based distribution of the values of IVs.

15. The method of standardizing and ranking network resource issues associated with a plurality of network elements in a wireless Enterprise Network (EN) of claim 11, wherein the parameters of acceptable or unacceptable resource health are determined using a Poisson based distribution of the IV values.

16. The method of standardizing and ranking network resource issues associated with a plurality of network elements in a wireless Enterprise Network (EN) of claim 15, wherein the Poisson based distribution is applied to count-related IVs such as service rejection or service preemption counts.

17. The method of standardizing and ranking network resource issues associated with a plurality of network elements in a wireless Enterprise Network (EN) of claim 14 or 15, wherein parameters for both recent (r) and growth (g) estimates are identified.

18. The method of standardizing and ranking network resource issues associated with a plurality of network elements in a wireless Enterprise Network (EN) of claim 12, wherein domain experts are able to adjust the parameters of acceptable or unacceptable resource health via a user interface (UI).

19. The method of standardizing and ranking network resource issues associated with a plurality of network elements in a wireless Enterprise Network (EN) of claim 11, wherein a distance metric (d) is calculated for each network element and wherein the distance metric is representative of the resource health of each network element, and wherein the distance metric (d) comprises a distance between acceptable resource health IV values and observed resource health IV values for each network element.

20. The method of standardizing and ranking network resource issues associated with a plurality of network elements in a wireless Enterprise Network (EN) of claim 19, wherein the distance metric (d) takes into account trends in long-term IV values.

21. The method of standardizing and ranking network resource issues associated with a plurality of network elements in a wireless Enterprise Network (EN) of claim 19, wherein the distance metric (d) further comprises a combination of distance metrics calculated for every IV value belonging to a set of IV values for each network element and for its set of corresponding and associated network resources.

22. The method of standardizing and ranking network resource issues associated with a plurality of network elements in a wireless Enterprise Network (EN) of claim 21, wherein (d) is calculated in accordance with the following formula: $d=f(weight\_R*d\_R\_i+weight\_S*d\_S\_i)$, and wherein d_R_i comprises a distance metric for recent data normalized per time unit for an IV value i, and wherein d_T_i comprises a distance metric for trends in observed data values normalized per time unit for the IV value i.

23. The method of standardizing and ranking network resource issues associated with a plurality of network elements in a wireless Enterprise Network (EN) of claim 22, wherein the function $f$ comprises a simple/weighted average, having a maximum across all of the IV values i.

24. The method of standardizing and ranking network resource issues associated with a plurality of network elements in a wireless Enterprise Network (EN) of claim 3, wherein the network elements are arranged into a plurality of logical groups of network elements, and wherein the logical groups are ranked in accordance with observed resource issues of each group of network elements.

25. The method of claim 24, wherein the network elements are arranged into the plurality of logical groups based upon the network element types of each network element.

26. The method of claim 24, wherein the network elements are arranged into the plurality of logical groups based upon the type of network resource consumed by each network element.

27. The method of claim 3, wherein the step c) of ranking factors that negatively impact the resource health of each of the network elements in the enterprise network comprises identifying probable causes of resource issues at the selected network element.

28. The method of claim 27, further comprising identifying two types of factors that may contribute to resource issues for a dynamic resource at the selected network element, and wherein the two types of factors comprise: (i) factors from general network usage growth, and (ii) factors that relate to unstable resource availability.

29. The method of claim 28, wherein the following factors are considered for the dynamic resource at the selected network element:
  (a) a resource availability per unit time; wherein the resource availability per unit time is determined by dividing an amount of resource currently available for use by a total resource expected to be available for use; and
  (b) a fluctuation in resource availability per unit time, wherein the fluctuation in resource availability per unit time is determined in accordance with the following: count of the resource upgrade+downgrade or downgrade+downgrade event pairs, observed per unit timed, and wherein downgrade occurs whenever resource availability is less than 100%.

30. The method of claim 27, further comprising identifying unknown or unmeasurable features that may contribute to the resource issues at the selected network element.

31. The method of claim 27, further comprising quantifying each factor's impact on a resource issue via a score/strength, m, wherein the quantifying step includes calculating an absolute value of a correlation metric between the factor and the resource issue, and wherein the correlation metric is determined using a well-known correlation determination technique; and wherein the calculated value of m comprises a score/strength of the factor and used to rank factors impacting the resource health of each of the network elements.

32. The method of claim 31, wherein if none of the factors' m values are greater than a selected threshold m_threshold, then alert a possibility of unknown/unmeasurable factors potentially impacting IV values.

33. The method of claim 32, wherein the threshold m_threshold can be modified and adapted during training.

34. The method of claim 3, wherein the step d) of generating network planning suggestions are based on significant factors impacting network resources as identified during step c).

35. The method of claim 3, wherein the step d) of generating network planning suggestions are based on significant factors impacting network resources as identified during step c).

36. The method of claim 3, wherein the step d) of generating network planning suggestions comprise simple rule-based methods based on estimated demand.

37. The method of claim 3, wherein the step d) of generating network planning suggestions comprise risk-based methods incorporating certainty in estimates, uncertainty in resource demand estimation, and associated costs for each alternative generated.

* * * * *